United States Patent
Goetz et al.

(10) Patent No.: US 11,195,355 B1
(45) Date of Patent: Dec. 7, 2021

(54) SECURE CONTAINER MUTUAL AUTHENTICATION

(71) Applicant: Wells Fargo Bank, N.A., San Francisco, CA (US)

(72) Inventors: Darren M. Goetz, Salinas, CA (US); Chris Kalaboukis, San Jose, CA (US); Lisa R. Magana, San Francisco, CA (US); Andrew L. Martinez, San Francisco, CA (US); Uma Meyyappan, Freemont, CA (US); Dennis E Montenegro, Concord, CA (US); Marla M. Pacis, San Francisco, CA (US); Timothy R. Ward, Mesa, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 52 days.

(21) Appl. No.: 16/177,249

(22) Filed: Oct. 31, 2018

(51) Int. Cl.
| G06Q 40/00 | (2012.01) |
| G07C 9/00 | (2020.01) |
| H04L 29/06 | (2006.01) |
| G06Q 20/10 | (2012.01) |
| G06Q 20/32 | (2012.01) |
| G06Q 20/40 | (2012.01) |

(52) U.S. Cl.
CPC ..... *G07C 9/00309* (2013.01); *G06Q 20/1085* (2013.01); *G06Q 20/3223* (2013.01); *G06Q 20/4014* (2013.01); *H04L 63/0869* (2013.01)

(58) Field of Classification Search
CPC .................................................. G07C 9/00309
USPC .......................................................... 705/43
See application file for complete search history.

(56) References Cited

U.S. PATENT DOCUMENTS

| 6,990,588 B1 * | 1/2006 | Yasukura ............... G07C 9/257 |
| | | 713/186 |
| 9,141,876 B1 * | 9/2015 | Jones ................. G06K 9/00442 |
| 9,692,879 B1 * | 6/2017 | Lack ...................... H04L 63/08 |
| 9,745,130 B1 | 8/2017 | Rawal |

(Continued)

OTHER PUBLICATIONS

Robust User Authentication Framework for Wireless Sensor Networks Authors: Kumar P, Choudhury A, Sain M, Lee S and Lee H. (Year: 2017).*

*Primary Examiner* — Bruce I Ebersman
*Assistant Examiner* — John A Anderson
(74) *Attorney, Agent, or Firm* — Foley & Lardner LLP (57) ABSTRACT

Systems and methods for mutual authentication of a user and a container administrator computer system. A container administrator computer system receives a request from a mobile computing device for a user to access a secure container. The request includes a user identifier. The administrator system receives a first authentication factor corresponding to the user. The administrator system authenticates the user by verifying that the first authentication factor matches a first reference authentication factor associated with the user identifier. The administrator system sends a second authentication factor associated with the administrator system to a human-machine interface associated with the secure container or the mobile computing device. The administrator system receives a notification of authentication of the administrator system using the authentication factor. The administrator system transmits an unlock signal to unlock the secure container.

16 Claims, 3 Drawing Sheets

(56) References Cited

U.S. PATENT DOCUMENTS

| | | | |
|---|---|---|---|
| 9,811,784 B2 | 11/2017 | Wan et al. | |
| 9,830,272 B2 | 11/2017 | Wan et al. | |
| 2019/0295350 A1* | 9/2019 | Wegelin | G07C 9/00912 |

* cited by examiner

SECURE CONTAINER MUTUAL AUTHENTICATION

TECHNICAL FIELD

The present disclosure relates generally to systems and methods for mutual authentication between a user and an entity to facilitate use of a secured container.

BACKGROUND

Containers are generally used to hold and store items. Some containers may include security features to prevent the theft of the items contained therein. For example, a container may include a locker which is secured via a physical lock opened by a key or numerical combination. Lockers, or similar containers, may be used by one party placing an item therein for another party to subsequently retrieve the item.

SUMMARY

In one aspect, this disclosure is directed to a computer-implemented method of providing mutual authentication. The method includes receiving, by a container administrator computer system from a mobile computing device of a user, a request from the user to access a secure container. The request includes a user. The method includes receiving, by the container administrator computer system, a first authentication factor corresponding to the user. The method includes authenticating, by the container administrator computer system, the user by verifying that the first authentication factor matches a first reference authentication factor associated with the user identifier. The method includes sending, by the container administrator computer system to the mobile computing device, a second authentication factor associated with the container administrator computer system. The method includes receiving, by the container administrator computer system from the mobile computing device, verification that the mobile computing device authenticated the container administrator computer system using the second authentication factor. The method includes transmitting, by the container administrator computer system to the secure container in response to authentication by the container administrator computer system and the mobile computing device, an unlock signal to unlock the secure container and provide the user physical access to the secure container.

In another aspect, this disclosure is directed to a system for providing mutual authentication for access to a secure container. The system includes a secure container configured to store an item and receive an unlock signal. The system includes a container administrator computer system communicably coupled to the secure container and a mobile computing device for the user. The container administrator computer system is configured to provide mutual authentication between the container administrator computer system and the mobile computing device for providing the user access to the secure container. The container administrator computer system is configured to provide mutual authentication by receiving, from the mobile computing device of the user, a request from the user to access the secure container. The request includes a user identifier. The container administrator computer system is configured to provide mutual authentication by receiving a first authentication factor corresponding to the user. The container administrator computer system is configured to provide mutual authentication by verifying that the first authentication factor matches a first reference authentication factor associated with the user identifier. The container administrator computer system is configured to provide mutual authentication by sending a second authentication factor associated with the container administrator computer system to the mobile computing device. The container administrator computer system is configured to provide mutual authentication by receiving, from the mobile computing device, verification that the mobile computing device authenticated the container administrator computer system using the second authentication factor. The container administrator computer system is configured to transmit, to the secure container in response to authentication by the container administrator computer system and the mobile computing device, an unlock signal to unlock the secure container and provide the user physical access to the secure container.

This summary is illustrative only and is not intended to be in any way limiting. Other aspects, inventive features, and advantages of the devices and/or processes described herein, as defined solely by the claims, will become apparent in the detailed description set forth herein, taken in conjunction with the accompanying figures, wherein like reference numerals refer to like elements.

DETAILED DESCRIPTION

Before turning to the figures, which illustrate the exemplary embodiments in detail, it should be understood that the present disclosure is not limited to the details or methodology set forth in the description or illustrated in the figures. It should also be understood that the terminology used herein is for the purpose of description only and should not be regarded as limiting.

In some instances, secure containers may be located in a generally unsecure (or publicly accessible) location. In such instances, items intended to be secured in such containers may not be as secure, given the containers themselves are publicly accessible. For example, when using a secure container, such as a locker, deposit box, or safe, to exchange an item, the party leaving an item in the secure container is assured that the container secure because the container is physically located at a location that is under the exclusive control of the recipient of the item. Examples of such containers include a post office box located at a post office. However, if the container is in an unsecure location, a user depositing an item in the container may not be assured that the container is properly managed, or even managed at all, by the entity which purports to manage the container. As a result, a transaction security threat exists, such as people impersonating the party that controls a secured container.

The systems and methods described herein provide technical solutions to the foregoing problem associated with using a secure container in an unsecure location. One solution is that the systems and methods described herein, which use mutual authentication, alleviate the need to rely on a secure location. For example, by deploying various methods doe mutual authentication, parties leaving items in a secured container are assured that a fraudulent party does not have access to the container as well. Thus, where a container is in a public place where fraudulent parties may otherwise have access to the container, the systems and methods described herein protect against fraudulent parties procuring access to the container while posing as a party to the intended transaction. Further, the systems and methods described herein not only enhance the security of a transaction, but they reduce the need for businesses to acquire, maintain, and operate expensive "brick and mortar" locations; thus, lowering business costs.

Authentication is a security method for verifying the identity of an individual or entity requesting information or access to a system, place, or application. In some instances, the entity may be authenticated via single-factor authentication ("SFA"), which authenticates the entity based one set of information or credentials (such as a username and password). In some instances, the entity may be authenticated via multi-factor authentication ("MFA"), which authenticates the entity based on a username and password to verify account access and, at least, a second set of information or credentials. In those instances, the factor(s) to authenticate parties are acquired through a process called "enrollment." In enrollment, parties and entities establish authentication factors and verifying information which is to be used to authenticate each other in one or more subsequent transactions. The factors may include, for instance, knowledge factors, biometric factors, possession factors, or location factors. In one embodiment, one party provides a biometric factor to the other party such as a fingerprint, which may later be provided again to authenticate the party during a subsequent transaction. In another embodiment, the party provides a knowledge factor, such as a personal identification number (PIN). In yet another embodiment, the party provides a possession factor, such as a bank card, identification card, or other physical object containing authentication information. In yet another embodiment, the party provides their location as an authentication factor. In some embodiments, mutual authentication may involve three or more parties, wherein each party authenticates themselves between at least themselves and another party to the transaction.

The authentication methods described herein may be used for a variety of transactions involving a secure container. In some embodiments, a user may authenticate themselves for depositing money, coins, or a check (e.g., generally an item) into the secure container. The item may be left for depositing into an account for the user. In this instance, an account management system may adjust the user's account to reflect the value of the deposited item. In another embodiment, the user deposits an item in the secure container to be received by a third-party user. In this instance, when the user deposits the item in the secure container, a container administrator computer system may communicate with the third-party user to inform them that the user has deposited the item in the secure container. The container administrator computer system may identify the item deposited in the secure container. In yet another embodiment, the user may deposit an item to the secure container. In exchange, a third-party user deposits another item (such as money or goods) in exchange for the deposited item in a different secure container. In this instance, the container administrator computer system may verify the proper item(s) deposited in the respective secure containers, and may communicate to both parties that the proper items have been deposited and are secure for retrieval.

Various embodiments described herein relate to systems and methods for mutual authentication of a user and an entity in control of a secure container. The secure container may be located in an insecure (such as a public) location. Mutual authentication is where at least two parties assure their identities (e.g., to an acceptable degree of certainty) to each other by providing one or more authentication factors to each other. Each entity may authenticate themselves prior to the user being provided access to the secure container. For instance, the user depositing the item(s) in the secure container may be authenticated by the secure container administrator system and may authenticate the secure container administrator system. Following such mutual authentication, the user may be provided access to the secure container. In some instances, the item deposited in the secure container may be intended for receipt by an institution which manages or controls the secure container, or the item may be intended for receipt by a third party. In other words, the institution may retrieve the item themselves, or the secure container administrator system may further mutually authenticate a third-party as the intended recipient of the item. The user, for example, may be an individual consumer, small business owner, logistical company, or another non-person entity; and the institution, for example, may be a bank, corporation, logistical company, courier, or other entity in the business of securing, transporting, or exchanging goods and items. In an example transaction, a transaction may include one or more users such as a depositing party and a different receiving party. In this context, mutual authentication includes (1) the administrator authenticating that the user is who the user purports to be and (2) the user authenticating that the container belongs to the institution that purports to operate/maintain the container. After both parties are authenticated, the user is provided access to the container to retrieve or deposit an item.

Figure 1:
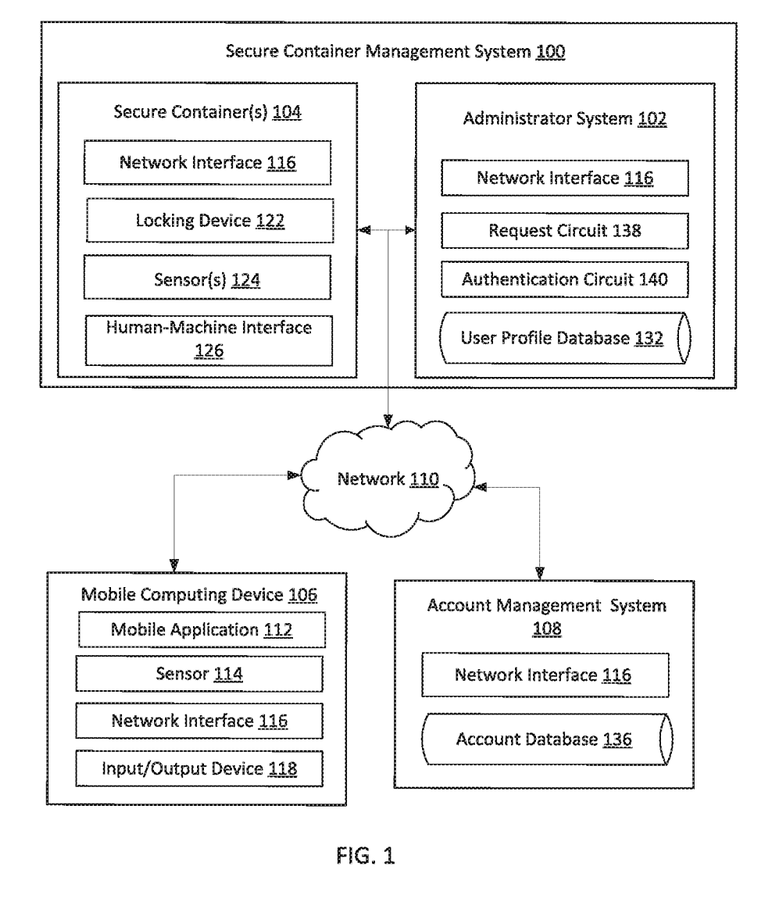
FIG. 1 is a block diagram of a secure container management system, according to an example embodiment.

Referring now to FIG. 1, a block diagram of a secure container management system 100 is shown, according to an example embodiment. The secure container management system 100 is shown to include an administrator system 102 (also referred to herein as a container administrator computer system 102) and secure container(s) 104. The secure container management system 100 may be communicably coupled to various mobile computing device(s) 106 (e.g., associated with corresponding users) and an account management system 108. The secure container management system 100 may be communicably coupled to the mobile computing device(s) 106 and the account management system 108 via a network 110. The various components of the system are operably and communicatively coupled through a network 110, which may include one or more of the Internet, cellular network, Wi-Fi, Wi-Max, a proprietary banking network, or any other type of wired or wireless network or a combination of wired and wireless networks. In some embodiments, the secure containers 104 may be managed by the same entity which manages an account for a user. In such embodiments, the account management system 108 may be a component of or included within the secure container management system 100.

In some embodiments, the administrator system 102 is configured to interface with other systems and components, such as the account management system 108, the secure container(s) 104, and the mobile computing device 106. In some embodiments, the administrator system 102 is configured to interface with the secure container(s) 104 across one network 110 (for instance, a Local Area Network ((LAN), Wide Area Network, (WAN), etc.) and is configured to interface with the account management system 108 and mobile computing device 106 across another network 110 (for instance, a cellular network, an internet-based network, etc.). In other words, various networks 110 may be used for connecting the systems and components described herein.

Each of the components/systems may include a network interface 116. The network interface 116 includes, for example, hardware and associated program logic that facilitates a connection to the network 110 and provides for communication between the administrator system 102, the secure containers 104, mobile computing device 106, and/or account management system 108. Thus, each of the components may be communicably coupled to one another to facilitate operative communication between the mobile computing device 102, the secure container system 104, the secure container administrator system 106, and the account management system 108.

The administrator system 102 is shown to include a request circuit 138 and an authentication circuit 140. Generally speaking, the request circuit 138 may be configured to execute various functions associated with a received request from a user for accessing a secure container 104. The authentication circuit 140 may be configured to execute various functions associated with authenticating users. As discussed in further detail below, the circuits may include one or more processors communicably coupled to one or more memory or memory devices. The processors may execute instructions stored in the memory (or otherwise accessible to the processors). In some embodiments, the circuits shown in FIG. 1 may be combined to form one circuit. In some embodiments, the circuits shown in FIG. 1 may be offboard the administrator system 102, but may still be communicably coupled to, and thus work in conjunction with, the administrator system 102.

The mobile computing device 106 is configured to execute, provision, or otherwise render a mobile application 112. The mobile application 112 may be a local application stored and executing on the mobile computing device 106, a cloud-based application which is delivered to the mobile computing device 106, a website or webpage, etc. The mobile application 112 is associated with the secure containers 104. The user may access the mobile application 112 and provide log-in credentials for requesting access to a secure container 104. The mobile application 112 may be used (e.g., through the mobile computing device 106) to request access to one of the secure containers 104. A user may generate the request by providing various information to a user interface for the mobile application 112. The mobile computing device 106 may be configured to communicate various requests (including such information) to the administrator system 102 for accessing one or more of the secure containers(s) 104. The mobile computing device 106 is configured to use the network interface 116 to deliver the request (via the network 110) to the administrator system 102.

The mobile computing device 106 may include various sensors 114 and an input/output (I/O) device 118. The sensors 114 may include an image sensor (e.g., a camera) for detecting visible light, a biometric sensor, etc. Such sensor(s) 114 may be configured to receive and/or detect information which may be used to authenticate the user/administrator system 102. The I/O device 118 is configured to facilitate interaction between the user and the mobile computing device 106. In one example embodiment, the I/O device 118 is a touch screen coupled to a cellular phone, which is configured as the mobile computing device 106. While described as a mobile computing device 106, in some instances, the mobile computing device 106 may be, for instance, a desktop, tablet, or other form of computing device.

In some embodiments, the user may set up a user profile or account for accessing the secure container 104 (referred to above as "enrollment"). The user profile may be maintained by an entity which manages the secure containers 104. The user profile may include, for instance, the user's name, address, account information (e.g., financial account information). The user profile may include authentication information. The authentication information may be used by the administrator system 102 for authenticating the user prior to providing the user access to a secure container 104. In some embodiments, the authentication information may be a preferred authentication factor which is used for authenticating the user. For instance, the user may select, from a number of different available authentication factors, which authentication factor is suitable for authenticating the user.

Various examples of authentication factors which may be available for selection include, for instance, biometric factors, knowledge factors, possession factors, proximity or location factors, etc. A biometric factor is a physiological identifier, such as a fingerprint, vocal signature, iris reading, facial profile, etc. A knowledge factor may be or include the proper answer to a challenge question pertaining to, for instance, a social security number, birthdate, address, PIN, a parent's birth city, mother's maiden name, or other security question which is known to the user. Possession factors may include the person being authenticated possessing a specific object which is used to authenticate that person. The specific object may be, for instance, a bank card with an account number, a driver's license, etc. The specific object may be a data packet or token uniquely assigned to the user. The proximity factor may include the mobile computing device 104 associated with the user being a predetermined distance or range from the secure container 104 (e.g., sensor(s) associated with the secure container 104).

When the user sets up the user profile (e.g., at enrollment), the user may provide the corresponding reference authentication factors as needed, which may be stored and associated with the user profile. The reference authentication factors may include, for instance, biometric information (fingerprint, facial identification, iris scan, etc.), a pin, passcode, a security question and corresponding answer, etc. Such reference authentication factors may be used for comparing to authentication factors provided by the user for subsequently accessing a secure container 104. Each of the user profiles may be stored at the administrator system 102 (e.g., in a user profile database 132, for instance).

Figure 2:
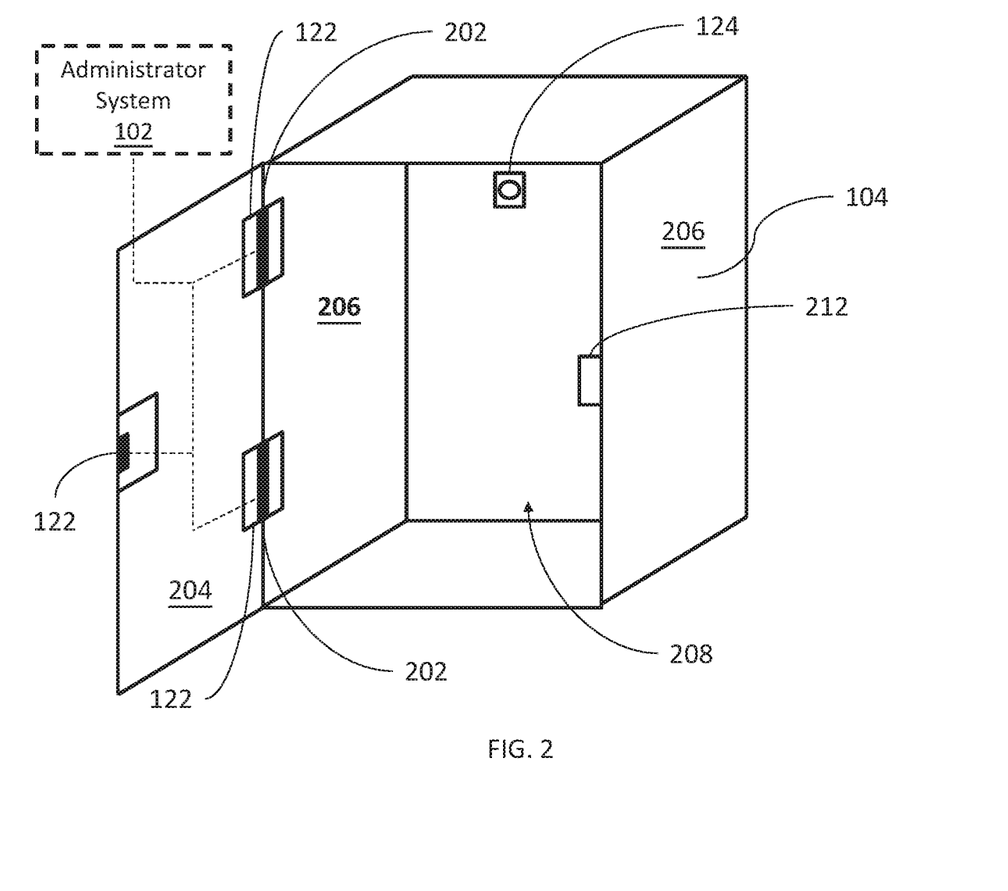
FIG. 2 shows an example secure container managed by the secure container management system of FIG. 1, according to an exemplary embodiment.

Referring now to FIG. 1 and FIG. 2, the secure container(s) 104 include a network interface 116, a locking device 122, one or more sensors 124, and a human-machine interface 126, according to an example embodiment. Specifically, FIG. 2 shows an example secure container 104, according to an exemplary embodiment. The various components of the secure container 104 are operably and communicatively coupled to the administrator system 102 and other systems/components shown in FIG. 1 through the network 110.

The locking device 122 may be an electronic or electrically controlled lock. In some embodiments, the locking device 122 may be a magnetic lock, an electronic lock, etc. The locking device 122 may be configured to lock a container door 204 for the respective locker 200. The locking device 122 may be located on and coupled to the container door 204. In some embodiments, the locking device 122 may selectively engage one or more walls 206 of the secure container 104 to prevent opening of the container door 204 (and thus accessing the storage space 208 for the secure container 104). For instance, the locking device 122 may engage one or more walls 206 of the secure container 104 at a joint 210 between the wall 206 and the container door 204. In this regard, the joint 210 between the wall 206 and container door 204 may be "loaded" by the locking device 122 such that the joint 210 may freely pivot when the locking device 122 is in an unlocked state. In some instances, the locking device 122 may be located on the container door 204 and include a locking mechanism (such as a deadbolt, for instance) that extends into a receiver 212 located on or near an interior wall 206. In each of these embodiments, the locking device 122 may be configured to selectively lock and unlock the container door 204 and thus prevent (or permit) access to the internal storage space 208 for the secure container 104.

The secure container 104 may include various sensor(s) 124 and a human-machine interface 126. The sensor(s) 124 may include cameras configured to detect light (e.g., visible light, x-ray light, etc.) outside and/or inside the secure container 104; weight scales configured to measure the weight of an item in the secure container 104; biometric sensors configured to measure biometric authentication factors from a user; etc.

The human-machine interface 126 includes devices and/or components configured to enable the user to receive, input, and/or exchange information with the administrator system 102 when the user is located at the secure container 104. Such information may be used for authenticating the user at the secure container 104. Additionally, such information may be used for authenticating the administrator system 102. In one example embodiment, the human-machine interface 126 is a touch screen display configured to convey information to and receive information from the user. In another example embodiment, the human-machine interface 126 is a personal assistant configured to interact with and talk to the user. In another example embodiment, the human-machine interface 126 is a device configured to receive, process, and transmit information from a possession authentication device provided by the user (such as a card reader). In other embodiments, the human-machine interface 126 is a communications device (such as an NFC device) configured to deliver information to and/or receive information from the mobile computing device 106. It should be understood that the example embodiments describing the human-machine interface is not meant to limit the current application. The human-machine interface 126 may be any device used to enable the exchange of information between the user and any system or component in the systems described herein.

The user may operate the mobile computing device 106 for generating a request to access a secure container 104. The request may include various information corresponding to the user. The information corresponding to the user may include a user identifier. The user identifier may include, for instance, log-in credentials, a name, an account number, or other information which may be used for identifying a particular user. The user identifier may be stored locally on the mobile computing device 106, may be provided by the user via the I/O device 118 to a user interface for the mobile application 112, etc.

The request may indicate whether an item to be stored in the secure container 104 is to be temporarily secured and subsequently retrieved by the user, the item is to be secured as part of a transaction and retrieved by another user, or the item is to be secured and retrieved by the institution or entity which manages the secure container 104. Where the item is to be retrieved by another user, the item may form a part of a transaction between the users. The request may indicate various information pertaining to the transaction (such as transaction amount, items to be exchanged, the parties to the transaction, etc.). In some instances, the request may be a request to access a secure container 104 including an item deposited therein (e.g., the request may be issued by a user retrieving the item).

Where the request involves a transaction, the request may include various information corresponding to the transaction. For instance, the request may include information corresponding to each of the parties involved in the transaction and information corresponding to the exchange. As used herein, "transaction" refers to the overall process of transferring a good from a seller to a buyer, transferring funds from the buyer to the seller, and information corresponding thereto. "Exchange," as used herein, refers to the specific exchange of the good from the seller to the buyer. The information corresponding to the parties may include account information, such as a bank account number and routing number, a credit card number, etc. Additionally, the information corresponding to the parties may include user identifiers associated with each of the users. The information corresponding to the users may further include a manner in which the users will authenticate themselves at the secure container(s) 104 (e.g., which authentication factor or factors will be used). The information corresponding to the exchange may include amount in exchange for the item (e.g., an agreed-upon purchase amount by the buyer for the item(s) sold by the seller). The information corresponding to the exchange may also include a size of the item(s), such as dimensions, weight, etc. The information corresponding to the exchange may include, for instance, a location of a desired secure container 104. The location may be identified based on a GPS sensor for the mobile computing device 106, manually provided by the user, etc.

In each of these embodiments, the information corresponding to the request may be communicated with the request from the application 112 to the secure container management system 100. The administrator system 102 may be configured to receive the request from the mobile computing device 106 (e.g., via the network interface 116 across the network 110). The request circuit 138 may be configured to analyze the request received from the mobile computing device 106. The request circuit 138 may process the request to identify, for instance, the party or parties involved with the request, a location of the secure container 104, etc. The request circuit 138 may identify user profiles for each of the users associated with the request.

The administrator system 102 may be configured to receive an authentication factor from the user. In some embodiments, the authentication factor may be received from the mobile computing device 106 (e.g., across the network 110 based on data from the mobile computing device 106). In some embodiments, the authentication factor may be received by the sensor(s) 124 and/or human-machine interface 126 associated with the secure container(s) 104. The user may authenticate themselves when they are present at the secure container 104. In some embodiments, the user may issue the request (e.g., via their mobile computing device 106) and authenticate themselves while located at or near the secure container 104. The authentication circuit 140 may be designed or implemented to authenticate the user prior to providing the user access to the secure container 104.

In one example embodiment, the user may authenticate themselves via a biometric factor. In this embodiment, the authentication circuit 140 may receive a biometric factor from the user. The biometric factor may be or include a physiological identifier, such as a fingerprint, vocal signature, iris reading, facial profile, etc. The user may provide their biometric factor to one or more sensor(s) 114 on their mobile computing device 106. The mobile computing device 106 may communicate the biometric factor captured by the sensor(s) 114 across the network 110 to the administrator system 102. The user may provide their biometric factor to sensor(s) 124 at the secure container 104. In each embodiment, the authentication factor provided by the user at the secure container 104 may be communicated to the administrator system 102. The authentication circuit 140 may be configured to identify the reference authentication factor associated with the user profile for the user (e.g., by cross-referencing the user identifier received in the request with data in the user profile database 132). The authentication circuit 140 may be configured to determine whether the biometric factor received from the secure container 104/ mobile computing device 106 matches the reference authentication factor associated with the user identifier (e.g., in the user profile). The authentication circuit 140 may authenticate the user when the biometric factor and the reference authentication factor match. Thus, the authentication circuit 140 authenticates them user based on a 1-to-1 authentication where the user's biometric identifier has only one match to the reference authentication factor associated with the user identifier.

In another example embodiment, the user may authenticate themselves via a knowledge factor. In this embodiment, the authentication circuit 140 may receive a knowledge factor from the user. A knowledge factor may be or include the proper answer to a challenge question pertaining to, for instance, a social security number, birthdate, address, PIN, a parent's birth city, mother's maiden name, or other security question which is known to the user. The user may respond to the security question via the human-machine interface 126 corresponding to the secure container(s) 104, the I/O device 118 for the mobile computing device 106, etc. The response provided by the user in each embodiment may be provided to the administrator system 102 across the network 110. The authentication circuit 140 may be configured to identify the reference authentication factor associated with the user profile for the user (e.g., by cross-referencing the user identifier received in the request with data in the user profile database 132). The authentication circuit 140 may be configured to determine whether the knowledge factor received from the secure container 104/mobile computing device 106 matches the reference authentication factor associated with the user identifier (e.g., in the user profile). The authentication circuit 140 may authenticate the user when the knowledge factor and the reference authentication factor match (e.g., the user provided the proper answer to the security question).

In another example embodiment, the user may authenticate themselves using a possession factor. Possession factors may include the person being authenticated possessing a specific object which is used to authenticate that person. The specific object may be, for instance, a bank card with an account number, a driver's license, etc. As described above, the human-machine interface 126 corresponding to the secure container 104 may include components or devices configured to read, register, or otherwise detect a hardware object. The human-machine interface 126 may include, for instance, a card reader. The user inserts, for instance, a bank card or other card with information associated with an identity to authenticate themselves. The authentication circuit 140 may be configured to determine whether the possession factor received from the human-machine interface 126 matches the reference authentication factor associated with the user identifier (e.g., in the user profile). The authentication circuit 140 may authenticate the user when the possession factor and the reference authentication factor match (e.g., the user inserted or otherwise provided the correct object to the human-machine interface 126, the object provided by the user included the proper information, etc.).

In some embodiments, the specific object may be a data packet or token uniquely assigned to the user. The data packet or token may be delivered to the administrator system 102 through NFC (e.g., an NFC device for the mobile computing device 106 and for the human-machine interface 126), across the network 110, etc. The data packet or token may be specific to the user and may be associated with the user profile database. The authentication circuit 140 may be configured to determine whether the data packet/token received from the human-machine interface 126 matches the reference authentication factor associated with the user identifier (e.g., in the user profile). The authentication circuit 140 may authenticate the user when the data packet/token and the reference authentication factor match.

In another example embodiment, the user may authenticate themselves using a location factor. The mobile computing device 106 may communicate a GPS location (based on data captured by a GPS sensor 114) to the administrator system 102. Thus, the user's location may be communicated via the user's mobile computing device 106 to the administrator system 102. The authentication circuit 140 may authenticate the user responsive to the user being located in close proximity to the secure container 104. Such embodiments may provide for authentication of the user without any intervention or control by the user.

In each of the above embodiments, the user requesting access to the secure container 104 may provide an authentication factor (e.g., by providing the authentication factor to or via their mobile computing device 106 or by providing the authentication factor to or via the human-machine interface 126 associated with the secure container 104). The authentication factor may be provided by the user may be communicated to the administrator system 102. The authentication circuit 140 may authenticate the user based on the authentication factor from the user. In some implementations, the authentication circuit 140 may identify a user profile in the user profile database 132 based on the user identifier from the request. The authentication circuit 140 may be configured to compare the authentication factor provided by the user to a reference authentication factor associated with the user identifier (e.g., stored in the user profile database 132 and associated with the user profile corresponding to the user identifier). In such implementations, the authentication circuit 140 is configured to authenticate the user based on the comparison of the authentication factor and the reference authentication factor.

In addition to the administrator system 102 authenticating the user, the user may also authenticate the administrator system 102. Such embodiments may provide for increased security by providing assurances to the user that the secure container 104 in which the user is depositing or storing an item is in fact managed, controlled, or otherwise operated by the purported entity/institution.

In a similar manner to the embodiments described above, the user may authenticate the administrator system 102 using a second authentication factor. The second authentication factor may be associated with or generally used for authenticating the administrator system 102. In some embodiments, the second authentication factor may be generated by the mobile application 112 of the mobile computing device 106 and communicated to the administrator system 102. In other embodiments, the second authentication factor may be generated by the authentication circuit 140 of the administrator system 102. In either embodiment, the administrator system 102 is configured to communicate the second authentication factor. The administrator system 102 may communicate the second authentication factor to the mobile computing device 106 and/or to the human-machine interface 126 corresponding to the secure container 104. The user/mobile computing device 106 may authenticate the administrator system 102 based on the second authentication factor. Following such authentication, the mobile computing device 106 and/or human-machine interface 126 communicates a notification indicating authentication of the administrator system 102 using the second authentication factor.

In some embodiments, the mobile application 112 on a user's mobile computing device 106 generates a computer-readable code (such as a QR code, a barcode, etc.) that can be read by the sensor(s) 124 corresponding to the secure container 104 (e.g., a camera or other image reading device). The sensor(s) 124 may capture the computer-readable code and may communicate corresponding data to the administrator system 102. The authentication circuit 140 of the administrator system 102 may verify that the secure container 104 which the user is accessing is under their control. The authentication circuit 140 may cross-reference, for instance, an IP address or other address/identifier associated with the secure container 104 with a database or other list of secure containers managed, controlled, or otherwise maintained by the administrator system 102. The authentication circuit 140 may also determine, based on the code from the mobile application 112, which mobile computing device 106 (and, correspondingly, which user) is accessing the secure container 104. The authentication circuit 140 may determine that the secure container 104 is managed or otherwise controlled by the administrator system 102 based on such cross-referencing and corresponding analysis.

In another example embodiment, the process of verifying via the computer-readable code may be reversed (e.g., the mobile computing device 102 scans a code on the human-machine interface), and administrator system 102 verifies the secure container 104. In each embodiment, the authentication circuit 140 may communicate a signal indicating that the secure container 104 is controlled by the administrator system 102 to the mobile computing device 106, and the user may select a user interface element for the mobile application 112 verifying the authentication of the administrator system 102. The mobile computing device 106 may then communicate a notification to the administrator system 102 indicating verification of authentication of the administrator system 102.

In another example embodiment, the mobile computing device 106 may authenticate the administrator system 102 by providing a code or identifier via a "push" method. For example, as the user approaches the secure container 104, the user may authenticate themselves via the mobile application 112 using at least one of the above-mentioned authentication factors. Simultaneously (or following successful authentication of the user), the mobile computing device 106 may both display and "push" an alphanumeric or numeric code from the mobile computing device 106 to the administrator system 102. The administrator system 102 may route the code to the human-machine interface 126 associated with the secure container 106. The human-machine interface 126 may display the code to the user. The user may determine whether the code displayed on the mobile computing device 106 and on the human-machine interface 126 match. Where the codes match, the user may select a user interface element (e.g., a button, for instance) on the human-machine interface 126 and/or on the user interface for the network application 112 via the I/O device 118. The selection may be communicated to the administrator system 102 which verifies that the mobile computing device 106 authenticated the administrator system 102. Accordingly, the user authenticates the party in control of the secure container 104, which may be located in an otherwise unsecure location.

In another example embodiment, the administrator system 102 may generate an alphanumeric code which is communicated to the human-machine interface 126 associated with the secure container 104. The human-machine interface 125 may display the alphanumeric code to the user. The user may type the alphanumeric code on the mobile application 112, which is communicated from the mobile computing device 106 to the administrator system 102. The authentication circuit 140 may verify that the alphanumeric codes match, which authenticates the secure container 104 is maintained by the administrator system 102.

According to other embodiments, the user may not take an active role in authenticating themselves or the administrator. In one example embodiment, the mutual authentication occurs through a "handshake" between the user's mobile computing device 106 and the administrator system 102 using sensor(s) 124 associated with the secure containers 104. A handshake is an automated process of communicating between two devices. In some embodiments, the handshake is configured to authenticate via challenge-handshake authentication protocol ("CHAP"), as described herein, or the like. The handshake is configured to use cellular connections, NFC, Bluetooth™, Wi-Fi, and the like, between the mobile computing device 106 and the sensor(s) 124 associated with the secure container(s) 104. In one example embodiment, the user, through the mobile application 112 on the user's mobile computing device 102, requests to access the secure container 104. The mobile computing device 106 communicates with the network interface 116 corresponding to the secure container 104 to retrieve identifying information associated with the secure container 104. The mobile computing device 106 may then present the identifying information associated with the secure container 104 to the administrator system 102 and an authentication factor (as described above) to authenticate the user. The administrator system 102 may authenticate the user, and communicate a notification back to the user's mobile computing device 106 indicating that the administrator system 102 controls the secure container 104 which the user is attempting to access. In another example embodiment, the handshake comprises information transferred via proximity communication, such as NFC. In this instance, the handshake communication authenticates the user and determines that the secure container 104 is under the control of the administrator system 102 by verifying that the user is proximately close to the secure container 102 under the administrator system's 102 control. Therefore, the user may authenticates themselves and the administrator system 102 via an automated handshake.

Following authentication of both the user (e.g., by the authentication system 102) and authentication of the administrator system 102 (e.g., by the mobile computing device 106 and/or the user directly), the administrator system 102 communicates an unlock signal to the locking device 122 of the secure container 104. The unlock signal causes the locking device 122 to unlock the secure container 104, thereby providing the user access to the secure container 104.

As described above, in some embodiments, the user may access the secure container 104 for storing an item for subsequent receipt by the same user. However, in some embodiments, the user may access the secure container 104 for depositing an item for subsequent retrieval by a representative of an institution or entity (such as the entity which manages the secure container 104), or by another user who is a party to a transaction.

The subsequent user which is a party to the transaction may authenticate themselves and the administrator system 102 in a manner similar to the authentication described above. In some embodiments, the request described above may correspond to a transaction. The transaction may be an exchange of goods. In these embodiments, the subsequent user may authenticate themselves for accessing two secure containers 104 (e.g., one secure container 104 which includes the item to be retrieved, and another secure container 104 which is empty and which the subsequent user is to deposit a good to be retrieved by the first user).

In some embodiments, the administrator system 102 may be configured to verify one or more aspects of the transaction. For instance, the administrator system 102 may be configured to verify that one user deposited an item, and that another user retrieved the item. Additionally, the administrator system 102 may be configured to verify the item. The sensor(s) 124 associated with the secure container(s) 104 may be arranged on or within the secure container 104. The sensor(s) 124 may include cameras, weight sensors, etc. The administrator system 102 may verify the item based on data generated by the sensor(s) 124.

As one example, referring briefly back to FIG. 2, the secure container 104 may include a camera. The camera may be configured to detect light in the visible light spectrum, x-ray spectrum (e.g., the camera may be an x-ray sensor), etc. The camera may be mounted within the secure container 104. Additionally, the camera may be mounted outside of the secure container 104, but still may be configured to generate image data corresponding to the storage space 208 for the secure container 104. The administrator system 102 may be communicably coupled to the sensor(s) 124 (e.g., the camera). Where the seller has not deposited the good in the secure container 104, the storage space 208 may be empty (and, accordingly, the image generated by the camera may show the empty storage space 208). The administrator system 102 may analyze the image generated by the camera to determine whether or not the storage space 208 is empty. When the storage space is not empty based on the analyzed image, the administrator system 102 may determine that the user has deposited the item in the secure container.

In some embodiments, the administrator system 102 may further analyze the image to determine whether the item deposited in the secure container 104 matches the item to be exchanged. As described above, the administrator system 102 may receive an identification of the item within the request generated by the user via the mobile application 112. Hence, the administrator system 102 may maintain exchange information including a description of the item to be exchanged. The administrator system 102 may analyze image including the item deposited in the secure container 104 to determine whether the item fits the description of the item to be exchanged (e.g., via image processing software accessible by the transaction circuit 300). Where the administrator system 102 verifies the item deposited in the locker 200 fits the description of the item to be exchanged, the administrator system 102 may update the exchange information to reflect the verification of the item.

As another example, the secure container 104 may include one or more weight sensor(s). The weight sensor(s) may be mounted at or near the base (or floor) of the secure container 104 to measure a downward gravitational force on the base of the secure container 104. The weight sensor(s) may be calibrated such that, when the secure container 104 is empty, the weight sensor(s) return a value which indicates the secure container 104 is empty. Where an item is placed in the secure container 104, the weight sensor(s) may return a value indicating that something has been deposited in the secure container 104, which may be communicated to the administrator system 102.

Following verification of the user depositing the item and, optionally, verification of the item itself, the administrator system 102 may generate a notification to communicate to the mobile computing device 106 associated with the user who is to retrieve the item. The second user may then authenticate themselves and the administrator system 102 upon arriving at the secure container 102, and the second user may then be provided access to the secure container 104 for retrieving the item.

The administrator system 102 may verify that the second user retrieved the item from the secure container 104. The administrator system 102 may verify that the second user retrieved the item in a manner similar to verifying the first user deposited the item in the secure container 104 (e.g., based on data generated by the sensor(s) 124 associated with the secure container 104). Following such verifications and the second user retrieving the item, the accounts associated with the users and contained in the request may be updated to reflect the transaction, as described in greater detail below.

In embodiments where the user deposits an item for retrieval by the entity or institution which manages the secure container, the representative may retrieve and verify the item deposited in the secure container. The item may be, for instance, money, coins, checks, bonds, or other monetizable assets which may be deposited into an account associated with an institution. The representative may, for instance, count the money/coins, verify that the check(s)/bond(s) match those identified in the request, etc. Following the representative verifying the item, the user's account may be updated to reflect the deposit.

The administrator system 102 may be communicably coupled to an account management system 108. The account management system 108 may be, for instance, an API for an institution which manages various accounts for users. The administrator system 102 may be communicably coupled to the account management system 108 across the network 110 via respective network interfaces 118. The account management system 108 may include an account database 136 which stores various account information and corresponding balances.

The account management system 108 may perform various functions corresponding to updating account information corresponding to the user(s). The administrator system 102 may identify account information contained or included with the request for accessing the secure container 102. The APIs may provide for the ability to initiate transfers of funds between accounts maintained by various institutions and/or updating accounts to reflect deposits.

In some embodiments, the administrator system 102 may communicate with the account management system 108 to update the account for the user depositing the item in the secure container 104 (e.g., following verification of the item and retrieval by the buyer or representative for the entity or institution managing the secure container 104). The administrator system 102 may instruct the account management system 108 to update the account for the user to reflect the deposit of the item. Where the deposited item is money, the administrator system 102 may instruct the account management system 108 to update the account for the user according to the amount of money deposited in the secure container 104. Where the deposited item is a good to be sold to another user (e.g., a buyer), the administrator system 102 may instruct the account management system 108 to update the account for the both the buyer-user and seller-user to reflect the agreed-upon transaction. The administrator system 102 may provide instructions to the account management system 108 to initiate the transfer of funds (according to the agreed-upon amount reflected in the request) from the account associated with the buyer to the account associated with the seller. The account management system 108 may correspondingly initiate the transfer of funds, thus updating the accounts for both users.

Figure 3:
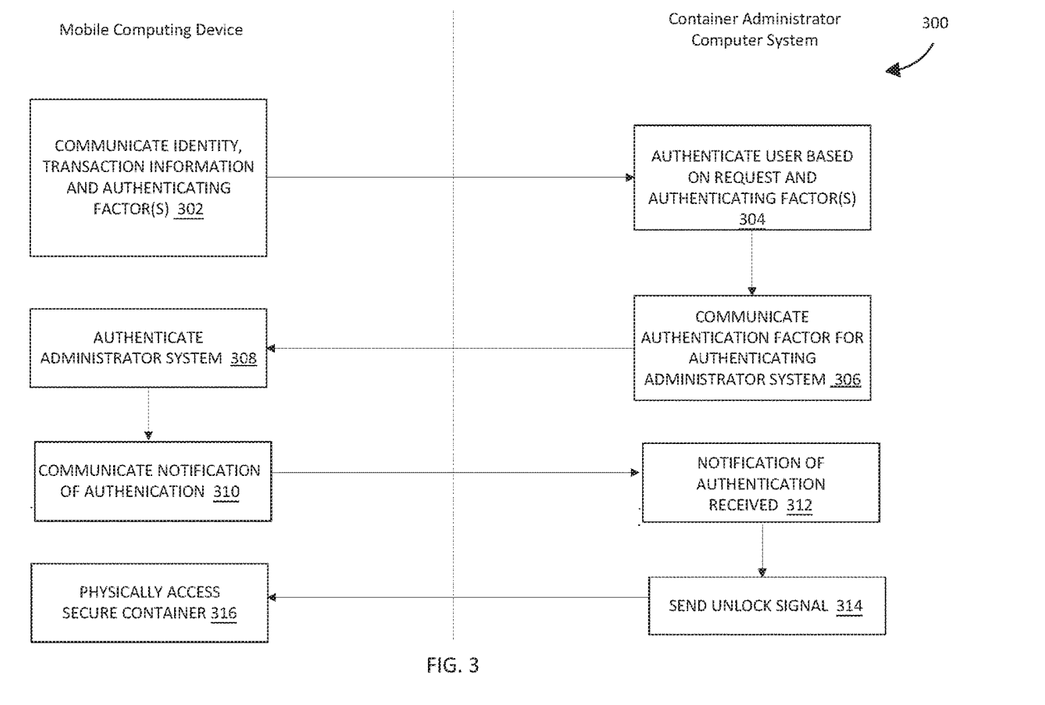
FIG. 3 is a flow diagram of a method of providing mutual authentication, according to an example embodiment.

Referring now to FIG. 3, depicted is a flow diagram of a method for mutual authentication, according to an example embodiment. In the example embodiment shown in FIG. 3, the method 300 involves the user and administrator, as discussed herein. In one example embodiment, the method 300 may be implemented using the systems and components described above.

In some embodiments, the method 300 may begin when a user physically approaches the secure container 104. In one example embodiment, the user, before, during, or after approaching the secure container 104, communicates information using a network-enabled mobile application 112 on their mobile computing device 106 to an administrator system 102 to indicate that they plan to use the secure container 104 to deposit or retrieve an item. For example, a user requests, via the mobile application 112, access to a secure container 104 to deposit or retrieve an item. Following generation of the request, the user may approach the secure container 104 to access the secure container 104.

At 302, the user identifies themselves and transmits information containing authentication factors to the administrator system 104. In one example embodiment, the user interacts directly with a human-machine interface 126 associated with a secure container 104. In another example embodiment, the user transmits information via the mobile application 112 on his or her mobile computing device 106. The information may include the user's account information, identity, location, the item to be deposited in the secure container 104, authentication factors, the recipient of the deposited item, the date and time of the intended transaction, etc. The information may include a user identifier. The user identifier may include, for instance, log-in credentials associated with a user profile corresponding to the user. The user identifier may be used for accessing a user profile and cross-referencing the authentication factors provided by the user to reference authentication factors from the user profile, as described in greater detail below.

The authentication factors may include biometric factors, knowledge factors, possession factors, or location factors. For example, the user inputs their fingerprint to either the human-machine interface 126 associated with the secure container 104 or the I/O device 118 on the mobile computing device 106. This information is passed onto the administrator system 102 for the secure container 104 via a network 110. The user may also transmit an identifying feature of a secure container 104, such as a serial number of the secure container 104, to assist the administrator system 102 in verifying the secure container 104. In some embodiments, the user provides information in the request which indicates that the entity or institution maintaining the secure container 104 is not the recipient of the item, but that the recipient is another user.

At 304, the administrator system 102 which maintains the secure container 104 verifies the information provided within the user request at 302. The administrator system 102 may also authenticate the user. In one example embodiment, the administrator system 102 cross-references the user identifier with a user profile database to identify the user profile corresponding to the user. The administrator system 102 may identify reference authentication factors disclosed during the enrollment process to verify that the requested user may use their secure container 104. For example, the user may provide a username and password along with a knowledge factor, such as a birthdate or PIN. The administrator system 102 verifies that the birthdate and PIN match the knowledge factor, thus authenticating that the user is who they purport to be. In another example embodiment, the administrator system 102 receives a biometric factor from the user, such as a fingerprint. The administrator system 102 verifies that the fingerprint on record from enrollment matches the fingerprint of the requesting user, thus authenticating that the user is who they purport to be. In yet another example embodiment, the administrator system 102 may automate the exchange of authentication factors via a handshake. For example, the user's mobile computing device 106 may receive a challenge, configured under CHAP protocol, prompting a response from the administrator system 102. The mobile computing device 106 responds, and the administrator system 102 checks that response against a predicted response based on an authentication method that is not shared over the network during the exchange, thus authenticating that the user is who they purport to be. The handshake may be conducted using, Internet, Wi-Fi, Bluetooth™, NFC, and the like.

At 306, the administrator system 102 communicates an authentication factor to the mobile computing device 106 to authenticate that the administrator system 102 is the entity that purports to operate or maintain the secure container 104. In one example embodiment, the administrator transmits a code configured as a knowledge-based authentication factor for the administrator system 102, prompting the user to verify the code. For example, the administrator system 102 communicates an alphanumeric code to the human-machine interface 126 associated with the secure container 104. The human-machine interface 126 may display the alphanumeric code to the user. In another example embodiment, the human-machine interface 125 displays an image or code that is only readable by a mobile computing device 106. For example, the human-machine interface 126 corresponding to the secure container 104 may display a QR code received from the administrator system 102. The user's mobile computing device 106 is configured to read the QR code with a camera and communicate information contained in the QR code with the administrator system 102. Alternatively, the QR code may be displayed on the mobile computing device 106, and the sensor 124 associated with the secure container 102 is configured to read the QR code and communicate the corresponding information to the administrator system 102. The administrator system 102 may determine that the codes match, thus authenticating that the secure container is managed by the administrator system 102. Other examples of computer readable images include a digital watermark embedded in a photograph or other authentication factors that are computer readable and displayed by the human-machine interface 126/mobile computing device 106. In yet another example embodiment, the administrator system 102 communicates with the mobile computing device to execute a handshake as described above in 304.

At 308, the user authenticates that the administrator system 102 is the entity that purports to operate the secure container 104. In one example embodiment, the user manually enters a code to authenticate the administrator as a knowledge-based factor. For example, the user inputs an alphanumeric code displayed on the human-machine interface 126 associated with the secure container 104 into his or her mobile computing device 126. The mobile computing device 126 may communicate the code inputted by the user to the administrator system 102. In this instance, the administrator system 102 confirms and indicates to the user that the inputted code from the user matches the code displayed on the human-machine interface 126 for the secure container 104. Thus, the user authenticates that the purported entity/institution is in control of the secure container 104. In another example embodiment, the human-machine interface 126 associated with the secure container 104 displays an image or code that is only readable by a mobile computing device 106. For example, similar to 306, the user's mobile computing device 106 is configured to read the QR code with a camera and verify the information with the administrator system 102 to authenticate the administrator system 102. In each of these embodiments, the user authenticates that the administrator system 102 is in control of the secure container 104.

In some example embodiments, 306, 304, and 308 happen simultaneously and without interaction from the user themselves. In other words, the mutual authentication at 304 and 308 initiates simultaneously when the user requests access to the secure container 104 at 302. In that instance, the communication between the administrator system 102 and mobile computing device 106 at each of 304, 306, and 308 occur simultaneously.

At 310, responsive to authentication of the administrator system 102, the mobile computing device 106 communicates a notification of the authentication to the administrator system. The mobile computing device 106 may communicate the notification across the network 110. The mobile computing device 106 may communicate the notification responsive to the user verifying that, for instance, the codes displayed on the human-machine interface 126 associated with the secure container 104 and on the user interface for the mobile application 112 matching. The mobile computing device 106 may communicate the notification following successful handshaking.

At 312, the administrator system 102 receives the notification from the mobile computing device 106. The notification may indicate successful authentication of the administrator system 102 using the authentication factor received by the mobile computing device 106 at 308 and used for authenticating the administrator system 102. The administrator system 102 may determine that both the user and the administrator system 102 both successfully completed authentication of each other (e.g., at 304 and 310). Hence, the method 300 may wait until both 304 is complete and the administrator system 102 receives notification of successful completion of 310.

At 314, the administrator system 102 sends an unlock signal to the secure container 104. The administrator system 102 may communicate an unlock signal across the network to the locking device 122 for the secure container 104 which causes the secure container 104 to unlock the container door. The administrator system 102 may communicate the unlock signal responsive to authentication by both parties (e.g. the user authenticating the administrator system 102, and the administrator system 102 authenticating the user).

At 316, the user physically accesses the secure container 104. In one example embodiment, the container door is unlocked following successful authentication by both parties and upon receipt of the unlock signal. The user may then open the secure container 104 following unlocking by the locking device 122 and places the item into (or retrieve the item from) the secure container 104.

In some embodiments, additional users may similarly authenticate themselves, for instance, to retrieve the item placed in the secure container 104. The additional users may be parties to the transaction, representatives of the entity which manages the secure container 104, etc. The administrator system 102 may verify depositing of the item, retrieval of the item, and, in some embodiments, the item itself. The administrator system 102 may verify depositing, retrieval, and the item itself via sensors 124 arranged to monitor the storage space 208 for the secure container 104. The administrator system 102 may communicate instructions to an account management system 108 to update accounts for the user(s) following such verification. Such embodiments may provide for seamless and secure use of secure containers 102, even in unsecure locations.

It should be understood that no claim element herein is to be construed under the provisions of 35 U.S.C. § 112(f), unless the element is expressly recited using the phrase "means for."

[73] As used herein, the term "circuit" may include hardware structured to execute the functions described herein. In one example embodiment, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In one example embodiment, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In one example embodiment, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud-based processor). Alternatively or additionally, the one or more processors may be internal and/or local to the apparatus. In this regard, a given circuit or components thereof may be disposed locally (e.g., as part of a local server, a local computer system, etc.) or remotely (e.g., as part of a remote server such as a cloud-based server). To that end, a "circuit" as described herein may include components that are distributed across one or more locations.

An exemplary system for implementing the overall system or portions of the embodiments might include a general-purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In one example embodiment, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web embodiments of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method of providing mutual authentication, the method comprising:
   receiving, by a container administrator computer system from a mobile computing device of a user, a request from the user to access a secure container, the request including a user identifier, wherein the request is a request to retrieve an item deposited in the secure container by a third party in accordance with an agreed-upon transaction;
   receiving, by the container administrator computer system, a first authentication factor for authenticating the user, wherein the first authentication factor comprises at least one of a proximity between the mobile computing device and the secure container, a QR code, a pin, or a token;
   authenticating, by the container administrator computer system, the user by verifying that the first authentication factor matches a first reference authentication factor associated with the user identifier;
   sending, by the container administrator computer system to at least one of the mobile computing device or a human-machine interface associated with the secure container, a second authentication factor for authenticating the container administrator computer system;
   receiving, by the container administrator computer system from at least one of the mobile computing device or the human-machine interface associated with the secure container, a notification indicating authentication of the container administrator computer system by the mobile computing device using the second authentication factor; and
   transmitting, by the container administrator computer system to the secure container in response to authentication of the user by the container administrator computer system and authentication of the container administrator computer system by the mobile computing device, an unlock signal to unlock the secure container and provide the user physical access to the secure container;
   verifying, by the container administrator computer system based on data from one or more sensors arranged on or within the secure container, that the third party deposited the item in the secure container prior to transmitting the unlock signal;

verifying, by the container administrator computer system based on data from the one or more sensors, that the user retrieved the item deposited in the secure container; and updating, by the container administrator computer system, a financial account associated with the user and a financial account associated with the third party in accordance with the agreed-upon transaction.

2. The method of claim 1, wherein the request is a request to deposit an item in the secure container, the item being an amount of money for depositing into an account associated with the user, and wherein the method further comprises:

updating the account by the amount of money following the user depositing the amount of money in the secure locker.

3. The method of claim 1, further comprising:

receiving, by the container administrator computer system from the secure container, an input received from the third-party indicating the item deposited is to be retrieved by the user.

4. The method of claim 1, wherein the secure container is a first secure container, and wherein the request further requests access to a second secure container for depositing a second item, and wherein the method further comprises:

transmitting, by the container administrator computer system to the second secure container in response to authentication by the container administrator computer system and the mobile computing device, an unlock signal to unlock a second secure container and provide the user physical access to deposit the second item in the second secure container.

5. The method of claim 1, wherein at least one of the authenticating by the container administrator computer system of the mobile computing device and authenticating by the mobile computing device of the container administrator computer system is performed automatically without any user intervention.

6. The method of claim 1, wherein sending the second authentication factor is performed in response to the container administrator computer system authenticating the user.

7. A system for providing mutual authentication for access to a secure container, the system comprising:

a secure container configured to store an item and receive an unlock signal; and a container administrator computer system communicably coupled to the secure container and a mobile computing device for the user, the container administrator computer system configured to:

provide mutual authentication between the container administrator computer system and the mobile computing device for providing the user access to the secure container, the container administrator computer system providing mutual authentication by:

receiving, from the mobile computing device of the user, a request from the user to access the secure container, the request including a user identifier, wherein the request is a request to retrieve an item deposited in the secure container by a third party in accordance with an agreed-upon transaction;

receiving a first authentication factor for authenticating the user wherein the first authentication factor comprises at least one of a proximity between the mobile computing device and the secure container, a QR code, a pin, or a token;

authenticating the user by verifying that the first authentication factor matches a first reference authentication factor associated with the user identifier;

sending a second authentication factor for authenticating the container administrator computer system to at least one of the mobile computing device or a human-machine interface associated with the secure container; and receiving, from at least one of the mobile computing device or the human-machine interface associated with the secure container, a notification indicating authentication of the container administrator computer system by the mobile computing device using the second authentication factor;

transmit, to the secure container in response to authentication of the user by the container administrator computing system and authentication of the container administrator computer system by the mobile computing device, an unlock signal to unlock the secure container and provide the user physical access to the secure container;

verify, based on data from one or more sensors arranged on or within the secure container, that the third party deposited the item in the secure container prior to transmitting the unlock signal;

verify, based on data from the one or more sensors, that the user retrieved the item deposited in the secure container; and update a financial account associated with the user and a financial account associated with the third party in accordance with the agreed-upon transaction.

8. The system of claim 7, wherein the user is a first user, the mobile computing device is a first mobile computing device, and wherein the request indicates the first user is requesting access to deposit an item in the secure container for retrieval by a second user, the request including a user identifier associated with the second user.

9. The system of claim 8, wherein the container administrator computer system is further configured to:

provide mutual authentication between the container administrator computer system and a second mobile computing device associated with the second user for providing the second user access to the secure container; and transmit, to the secure container in response to authentication by the container administrator computer system and the second mobile computing device, an unlock signal to unlock the secure container and provide the second user physical access to the secure container for retrieval of the item.

10. The system of claim 8, wherein the request indicates the item to be deposited in the secure container, and wherein the container administrator computer system is further configured to:

verify, based on data from the one or more sensors, that the contents of the container match the item indicated by the request.

11. The system of claim 8, wherein the secure container is a first secure container of a plurality of secure containers, and wherein the request further requests access to a second secure container of the plurality of secure containers for receiving a second item in exchange for the first item, and wherein the container administrator computer system:

transmit, to the second secure container in response to authentication by the container administrator computer system and the mobile computing device, an unlock signal to unlock the second secure container and provide the user physical access to receive the second item in the second secure container.

12. The system of claim 7, wherein the container administrator computer system is configured to send the second authentication factor in response to the container administrator computer system authenticating the user.

13. The system of claim 7, wherein sending the second authentication factors is performed in response to the container administrator computer system authenticating the user.

14. The system of claim 7, wherein the request is a request to deposit an item in the secure container, the item being funds for depositing into an account associated with the user.

15. The system of claim 14, further comprising:
one or more sensors arranged to generate data for verifying the user deposited the item in the secure container;
wherein the container administrator computer system is further communicably coupled to an account management system, and the container administrator is further configured to:
verify, based on the data from the one or more sensors, that user deposited the funds in the secure container; and
communicate a signal to the account management system responsive to verifying that the user deposited the funds, the signal instructing the account management system update the account for the user to reflect the user depositing the funds in the secure container.

16. The system of claim 7, wherein the second authentication factor is sent to the human-machine interface associated with the secure container and wherein receiving the notification comprises:
receiving, by the container administrator computer system from the mobile computing device associated with the user, the notification indicating authentication of the container administrator computer system responsive to the second authentication factor displayed on the human-machine interface matching a code input by the user to an application of the mobile computing device associated with the container administrator computer system.

* * * * *